May 9, 1950 — J. S. BAKER — 2,507,363

POLE CABLE TERMINAL

Filed Oct. 30, 1946 — 4 Sheets-Sheet 1

INVENTOR.
John S. Baker
BY Thiess, Olsen & Mecklenburger
Attys.

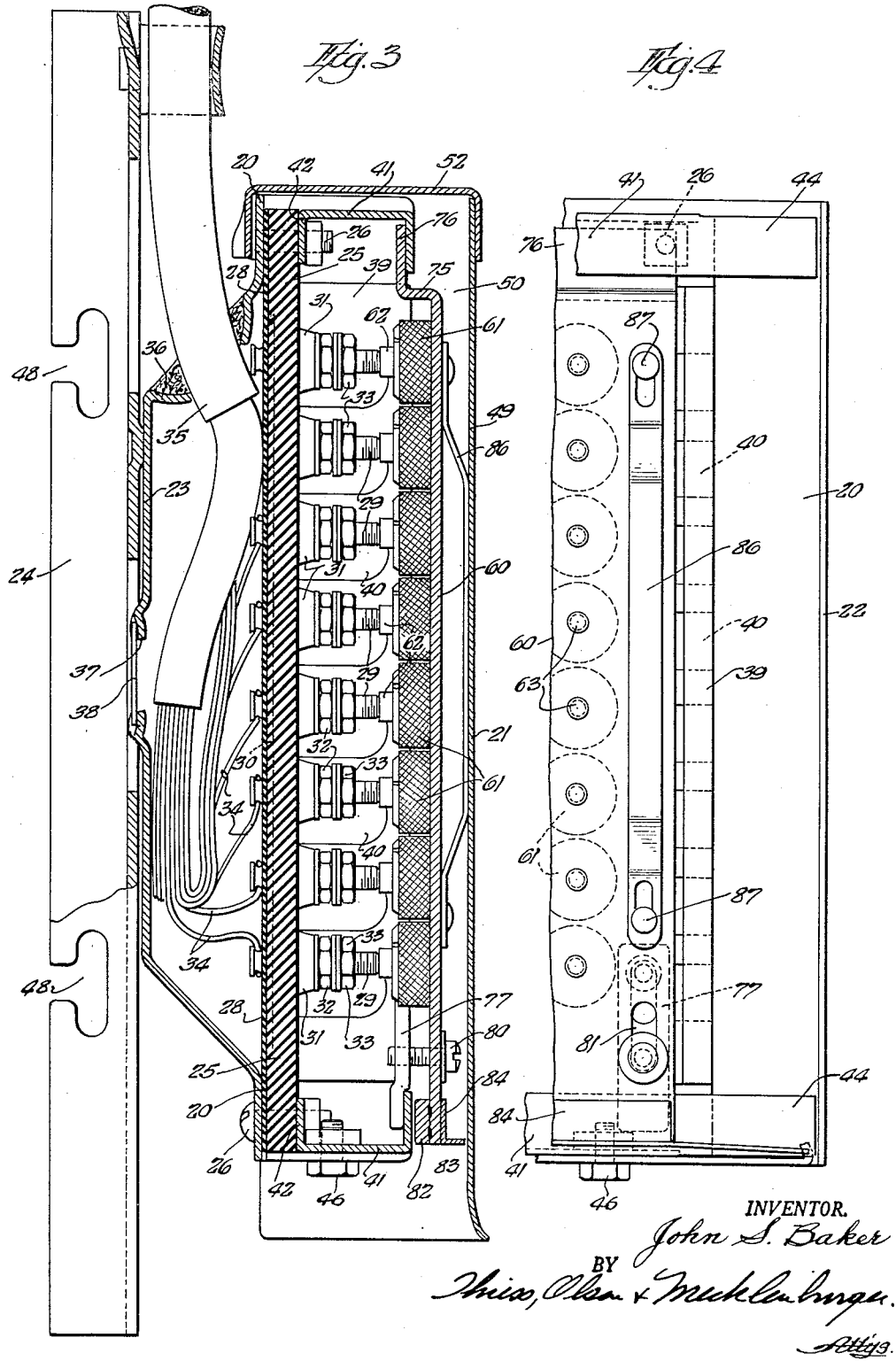

May 9, 1950     J. S. BAKER     2,507,363
POLE CABLE TERMINAL
Filed Oct. 30, 1946     4 Sheets-Sheet 3
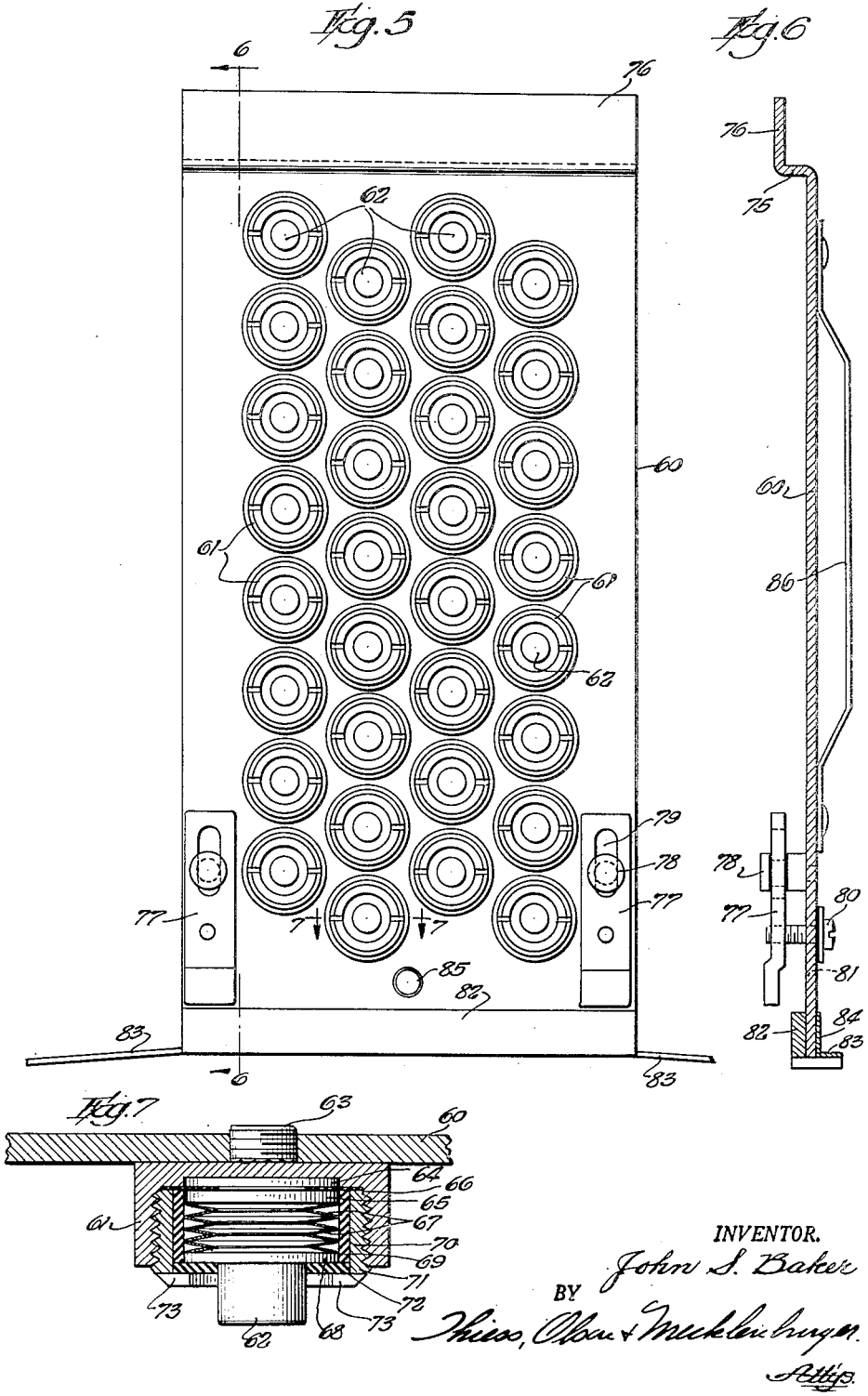
INVENTOR.
John S. Baker
BY Thiess, Olsen & Mecklenburger
Attys.

May 9, 1950        J. S. BAKER        2,507,363
POLE CABLE TERMINAL
Filed Oct. 30, 1946                                 4 Sheets-Sheet 4
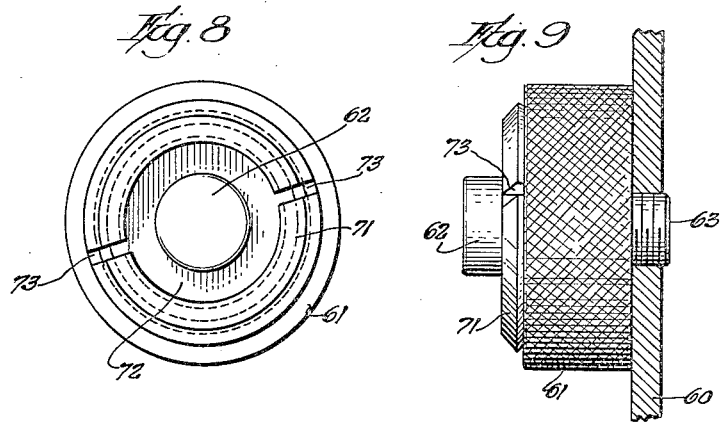
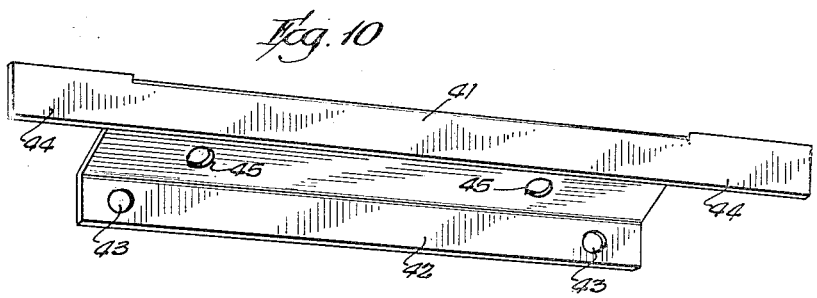
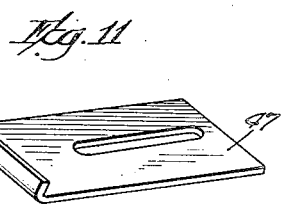
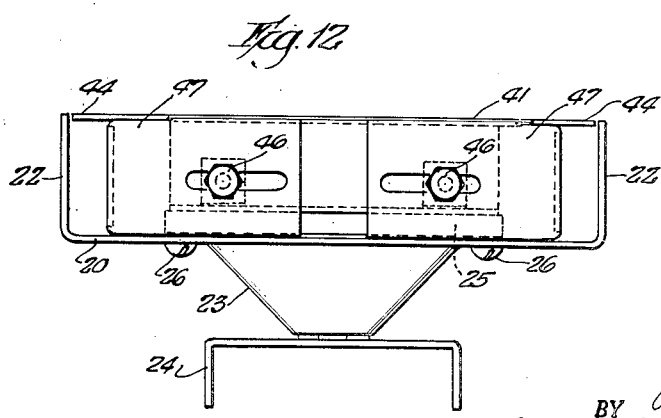
INVENTOR.
John S. Baker
BY
Attys.

Patented May 9, 1950

2,507,363

UNITED STATES PATENT OFFICE 2,507,363

POLE CABLE TERMINAL

John S. Baker, Chicago, Ill., assignor to Cook Electric Company, Chicago, Ill., a corporation of Illinois Application October 30, 1946, Serial No. 706,529

11 Claims. (Cl. 175—30)

This invention relates to cable terminal boxes and high potential protection in connection therewith for the lines, such as subscribers' telephone lines, entering the boxes.

Such terminal boxes are usually mounted on telephone poles or other supports and may comprise an insulating plate or base having binding posts or connecting studs extending therethrough. The cable comes into the box at the back of the plate and its wires are fanned out and respectively connected, usually by soldering to the rear ends of the said binding posts or studs. The outer ends of the studs on the face of the plate are threaded and are provided with binding nuts to which drop wires, so called, may be connected and lead to the subscribers' stations. A sheet metal housing surrounds the plate and a removable cover is provided therefor over the binding posts or studs at the front. By removing or opening the cover the front face of the plate and the studs with their binding nuts are exposed for connecting the drop wires thereto or making any desired changes in the connections therewith.

It is frequently desired to furnish the subscriber lines connected with the box, or some of them, with high potential arrester or discharger protection. The need for it may not be apparent until after the original installation. Or subscribers may be added, or disconnected.

It is an object of this invention conveniently to provide such high potential protection in connection with a terminal box of the type described whereby any or all lines served by the box may be so furnished with the desired protection.

In carrying out the invention, advantage is taken of the bank of binding posts or studs projecting forwardly from the face of the insulating base. These are symmetrically arranged, two to a line, to take care of as many lines as the terminal box and cable accommodate, usually 6 to 26 pairs. The drop wires connect at the sides of the studs or posts and extend laterally out through the side fanning strips, leaving the forward ends of the studs or posts exposed and facing forwardly.

Accordingly, provision is made for operatively connecting the lightning arresters or high potential dischargers to these exposed ends of the binding posts during the time the box is in regular use and service.

To accomplish this phase of the invention in the preferred manner, a unit arrester holder in the form of a plate is located over or in front of the ends of the group of binding posts or studs, said plate having arresters or dischargers mounted thereon opposite the ends of said studs when the plate is in final position and operatively abutting and engaging said stud ends, so that each line connected to the studs is suitably protected by an arrester or discharger.

The unit plate holder may be removably mounted to give access to the binding posts or studs and the dischargers or arresters may be individually and detachably mounted on the unit place for providing protection to all or any number of the lines desired which are connected to the studs.

The dischargers themselves are preferably of the button type, for their sturdy construction, for compactness in view of their lateral proximity, for short length in view of the narrow space therefor, and for the provision of spring-pressed plungers as the line terminals to engage with abutting contact the ends of the respective studs while their opposite grounded terminals form their enclosing casings and connecting seats to the plate.

The unit arrester or discharger plate may be applied to the box in various ways so that it may be removed from the studs for servicing when desired and will cause the dischargers to operatively engage the studs when the box is closed for use, but in this instance it is preferably readily attachable and detachable to the body of the box with or without change therein, whereby the box and its cover may be standardized and can readily be converted into a protected box by adding the unit protector.

These and other objects and advantages will more fully appear from the description and claims to follow, in connection with the drawings, which illustrate, by way of example but not of limitation, an embodiment of the invention, and in which—

Figure 1 is a sectional plan view of the box taken on the line 1—1 of Fig. 2;

Fig. 2 is a front elevation of the box with certain parts broken away to show the interior construction;

Fig. 3 is a vertical cross-section of the complete terminal box, said section being taken on a plane represented by line 3—3 of Fig. 2;

Fig. 4 is a front elevation of one side of the box with the cover removed;

Fig. 5 is a front elevation of the unit protector plate;

Fig. 6 is a vertical section of the same on the line 6—6 of Fig. 5;

Fig. 7 is a cross-section of the button arrester or discharger taken on the line 7—7 of Fig. 5, said button being shown on an enlarged scale;

Figs. 8 and 9 are, respectively, line terminal end and side views of the said arrester or discharger and on a similar enlarged scale;

Fig. 10 is a separate view of the channel member employed at both the top and the bottom of the box;

Fig. 11 is a perspective view of the sliding plate used at the bottom of the box to cover the opening of the drop channel on each side; and Fig. 12 is a bottom end view of the terminal box without the cover and showing said sliding plates in position thereon.

Referring to these drawings, the terminal box may include a sheet metal housing body 20, preferably of pressed steel, and a cover 21. The body 20 has forwardly extending side edges 22 and a rearwardly formed central portion 23, forming a cable chamber, and which may be secured, as by spot-welding or otherwise, to a suitable mounting bracket 24 adapted to be secured in any well-known way to a telephone pole or other support.

An insulating mounting, base or face plate 25 is secured to the inside of the housing 20 over and forming the front of the cable chamber mentioned. Corner screw bolts 26 and intermediate bolts 27 (Figs. 1 and 3) along the sides of the plate may be used to secure them together. A thin sheet or layer of cushioning material 28 may be interposed between the plate 25 and housing 20.

This plate 25 forms the support for the binding posts or connecting studs 29 between the cable wires at the back and the drop wires on the front leading to the subscribers' stations. They are preferably arranged in vertical rows, as indicated, in any number, according to the size of the terminal. At the back the plate 25 is preferably vertically grooved, as at 30, to accommodate the squared heads of the studs 29 to prevent them from turning or getting out of position. The front face of the plate is formed with raised bosses or stud mountings 31, through which the studs 29 pass and are secured therein by suitable washers and nuts 32. Binding nuts 33 and suitable washers on the forward threaded ends of studs 29, together with the nuts 32, form the terminals to which the drop wires are secured on the face of the plate 25. The raised stud mountings eliminate surface leakage.

The rear projecting ends of these studs 29 are formed to receive the ends of the cable wires 34, which may be tied thereto by a half hitch and soldered in place or otherwise permanently connected thereto. The cable 35 itself may be brought into the cable chamber through a suitable strap at the upper end of the bracket 24 and through the recessed opening 36, which recess may be filled with solder to form a tight and strong vibration-proof connection between the cable and cable chamber.

After the cable conductors or wires are thus fanned out and secured, respectively, to the studs 29, the cable chamber may be filled with any suitable molten insulating compound which upon hardening serves to maintain the connections in their proper positions and insure against shorts and grounds and the entrance of moisture. Such filling of the cable chamber may take place through an aperture 37, Fig. 3, in the back wall 23, which after filling may be covered by a metal disc 38 soldered at its periphery to the wall 23.

This face plate 25 is not as wide as the space between the edge members 22 of the housing 20 and is provided with forwardly projecting side fanning strips 39 paralleling said edges 22 and spaced therefrom to form vertical side drop-wire channels therebetween. These fanning strips are provided with fanning holes 40 through which the drop wires from the binding studs 29 may pass laterally into the side channels and thence down the channels and out of the box at the bottom.

The face plate 25 and the fanning strips 39 are preferably of any suitable insulation material, with the back grooves 30, the front bosses 31 and the fanning and bolt holes all formed therein.

Across the top and bottom of the face plate 25 are the channel bars 41, 41, preferably alike and shown separately in Fig. 10. The inner flange 42 is provided with bolt holes 43 for the bolts 26, and the outer flange 44 is extended at the ends substantially to the edge members 22 of the housing 20. The web is provided with holes 45 which in the upper position are not used but in the bottom position they accommodate the screws 46 of cover slides 47 attached to the outer face of the web and which are adapted to cover so much of the bottom ends of the side channels as are not taken up by the drop wires passing therethrough. This bottom end of the box is not covered by the cover of the box when in closed position, so that the slides 47 or weather guards are employed to exclude snow, rain, dirt and insects at the drop wire openings.

The reason for providing the holes 45 in the upper channel 41 is not only for manufacturing convenience but sometimes the cable stub 35 comes from the bottom instead of from the top as shown. In such case the head or housing may be reversed, and the weather guards 47 are then removed and applied to the then lower channel 41, utilizing the holes 45 therein for the screws 46, since the drop wires would still emerge from the bottom of the box.

This reversibility also accounts for the T-shaped bayonet slots 48 in the mounting bracket 24 (Fig. 3) in case a detachable mounting bracket is employed, the said slots slipping over the screws in the fixed portion of the bracket attached to the support and down to the upper ends of the slots regardless of which end of the housing may be uppermost.

The terminal box in this condition as so far described, with a suitable sheet metal cover preferably adapted to slip down over the same, may be used without arrester or discharger protection where such protection is not desired. In fact, heretofore, such boxes in general were known to the art as unprotected cable terminals and were listed, sold and used as such. If protection was desired, a different, more complicated and more expensive box had to be installed. The cover 21 shown comprises a pressed sheet metal plate 49 extending over the front of the box, with side or edge members 50 with inturned edges 51 at the rear of the box extending nearly to the bottom, and a top edge member 52 flanged at the edges and fitting down over and secured by soldering, welding or otherwise to the front and side edge members. The front and side portions extend slightly below the lower end of the body portion when the cover has been slipped down thereover to protect the same and are preferably flared out slightly at the bottom edge to assist in placing it over the stationary housing.

In order to convert such a so-called unprotected cable terminal into a protected terminal without reconstruction, undue trouble, inconvenience or expense or, if installed, without disturbance of the installation, and, further, so that any or all the lines connected with the terminal may be so protected, or the protection changed from some of the lines to others as conditions may require, and that the same may be carried out as part of the routine servicing of the installations without special skill or special tools or the application of heat, which might be inconvenient at the top of a pole, for instance, a unit protector support may be applied to the face of the box over the bank of binding posts or studs, said support being supplied with arresters or dischargers, preferably individually attachable and detachable, which when the support is in place over the bank of studs are brought into operative relation and firm contact with the respective binding studs. The corresponding lines are thus protected, the arresters or dischargers, of course, being suitably grounded through the frame of the box, its supporting bracket, etc. The unit support being readily removable from its operative position with respect to the studs, the latter are made readily accessible for any desired purpose in the usual way.

This unit support, in the present instance in the form of a rigid plate or panel 60, is shown separately in Figs. 5 and 6 and as installed in the box in Figs. 1 to 4.

This plate 60 carries on its inner face the dischargers or arresters 61, preferably one opposite or in front of each binding stud 29, and with its outwardly spring-pressed line terminal 62 firmly pressed against the end of the stud 29 when the unit plate is in operative position in the box.

The preferred form of arrester or discharger is shown on an enlarged scale in Figs. 7, 8 and 9. It is of the button type and comprises a cylindrical metal casing 61, which may be knurled on its outer surface and provided with a threaded stem 63 adapted to screw into the plate 60 and solidly seat the casing on said plate. Suitable carbon disc electrodes 64 and 65 with an interposed dielectric ring 66 of suitable material are seated in the bottom of the circular recess in the casing 61 and provide the spark gap therefor.

A Bellville spring consisting of dished metal washers 67, heat-treated to spring temper, are grouped on electrode 65 and press at the outer end on the head or flange 68 of the plunger line terminal 62 of the device. A relatively thick insulating sleeve 69 surrounds the spring 67, bears at its inner end on the said ring 66 and forms an insulating lining for the metal cylindrical portion 70 of the cap 71 of the arrester. This cap is threaded, as indicated, to screw tightly into casing 61 and engages at its inwardly extending outer end portion with and over the peripheral portion of a heavy insulating washer or ring 72 on the plunger terminal 62. This washer peripherally engages the end of insulating sleeve 69. The terminal plunger head 68 is normally pressed against the inside of washer 72 by the spring 67. The plunger 62 closely fits but freely slides axially in the washer 72 against such spring pressure. The cap 71 has an enlarged opening through which the plunger passes without contact therewith. Radial slits or grooves 73 may be formed in the end of the cap for the application of a suitably formed wrench or tool for tightening or loosening the same. When the parts are assembled as shown and cap 71 tightened, the parts are all firmly held together, the cap as well as lining sleeve 69 engaging and clamping the ring 66, and the spring 67 being under comparatively strong pressure but yieldable for a short distance under greater pressure. This ensures good contact of the line terminals 62 with each of the studs 29 even though the latter may vary in height slightly or the terminals vary slightly in their projections owing to manufacturing tolerances or other causes. The construction of the arrester or discharger is thus most sturdy, the relatively large plunger is not liable to stick or get out of order even by more or less side thrusts on its end, and its large size ensures good contact as a line terminal with the ends of the studs 29 even though precise axial alignment of the two may not obtain. Its compactness, that shown in the drawing being in one form or adaptation thereof scarcely three-fourths inch in outside diameter of the casing, enables the same readily to be grouped on the support 60, as shown, to correspond to the connecting studs 29 on the face plate 25.

With the plate or unit support 60 thus equipped with all or any number of arresters or dischargers 61, it is applied to the face of the box in such manner as to cause the individual arresters to make operative connection with the respective lines to be protected. Such connection is preferably by making the line terminals 62 physically contact and strongly press upon the ends of the connecting or binding posts or studs 29 in order to make suitable electric contact therewith. The unit support is preferably so supported as to be readily removable from in front of the bank of studs for convenient access to the same when occasion requires. In a copending application, Serial No. 786,242, filed November 15, 1947, as a division of application, Serial No. 693,796, filed August 29, 1946, I have shown the unit plate and same arresters attached to the inside of the cover of the box. In the present instance it is preferred to attach the unit holder to the box independently of the cover. It is realized that various ways may be employed to support and operate the unit without departing from the scope or principle of the invention, and it is the intention to claim the same generically in said divisional application. In the present instance it is preferred also to so attach the unit protector holder that no change may be required in the box. Thus, the box and the protectors may be handled, sold and installed together or as separate standard units to be combined when and if desired.

Thus, one end, the upper end preferably, of supporting plate 60 is bent at an offset, as shown at 75 and 76. The end 76 may be readily inserted under the forward flange of the channel cross-bar 41 at the top of the box, as seen in Figs. 3 and 4 particularly, tipping or swinging the plate outwardly at its lower end to a greater or less extent, the more readily to insert the same, the offset 75 providing a limiting guide in such positioning of the plate in such insertion. Then by pressing the lower end of the plate 60 in toward the box, the arrester line terminals 62 are brought into firm and resilient contact with the ends of studs 29. The opposite or lower end of the unit carrier plate 60 is provided near the two side edges and on the inside of the plate with two sliding catches 77, 77, which, when the lower end of the plate 60 is so brought down upon the forward flange of channel 41 at the lower end of the box, may be slipped downwardly so that their ends engage under the said flange of the said channel, as shown clearly in Fig. 3.

These sliding catches, as seen in Figs. 5 and 6, are secured to and spaced from the plate 60 by the headed lugs or pins 78 on the plate working in suitable slots 79 in the latch bars 77, and by screws 80 slidable in vertical slots 81 (Figs. 2 and 4) in the plate 60. When in latched position, the screws 80 may be tightened to bind the plate 60 tightly in position.

The lower end of the plate 60 may be provided with a metal bar 82 on the inside to stiffen the same and to rest on the top of the flange of channel 41, and a light metal strip 83 in a plane at right angles to the plate 60 to fill in the space across the bottom of the box between the cover and channel flange 41, said strip having a portion cut out and bent up, as at 84, to form a flange to secure the same to the plate 60. The bar 82 and the flange 84 may be secured to the plate 60, as by spot welding or otherwise.

A guide lug 85 (see Fig. 5) may be secured on the inside of plate 60 near the center and on the inside of same to ensure the proper positioning vertically of the plate 60 before the catches 77 can be closed, said lug striking the top of the flange of channel 41 if the plate 60 drops below its proper position. Said lug also holds the plate 60 in its vertical position while the catches 77 are being worked upon to close the same. The spring plungers or line terminals 62 in the arresters are all compressed by the studs 29 when the plate 60 is in its final closed position, so that it takes considerable effort to hold and close the same.

The arrester plate 60 may be provided on its outer face and along its vertical edges with spring strips 86, Figs. 1 to 4, and 6, one on either side, spaced therefrom except at the ends, which are slotted and secured by rivets 87 to said plate. These springs press stiffly against the inside of the cover when the latter is in place, to hold it tightly in position on the box. The end portions of the springs are inclined to enable the cover readily to be slipped thereover. The slots at the rivets permit the elongation of the springs when compressed by the cover.

The cover may have a suitable chain 88 attached thereto conveniently to suspend it from an adjacent pin, hook or object when servicing the box.

The spark gap of the arrester or discharger is, of course, across from one carbon electrode to the other, the electrode 65 being conductively connected through the spring 67 with the plunger line terminal 62 and insulated from the cap 71 and casing 61, and the electrode 64 being conductively connected with the casing 61 and grounded thereby and by the plate 60 and box while insulated from the terminal 62. Thus, any subscriber's lines connected by drop wires to the studs 29 receive high potential protection through the corresponding arresters or dischargers.

In this way a so-called unprotected terminal box may be converted into a protected box and preferably without change in the latter and in such a way as not to interfere with the normal manner of use, installation, care of same, and connection and disconnection of lines therewith. Moreover, any or all lines connected with the box may be so protected, the arresters or dischargers being readily and individually connected to or disconnected from the supporting plate by the threaded stud 63. The arresters or dischargers being self-contained, compact, completely enclosed and of rugged construction, they are not subject to breakage or getting out of adjustment by rough handling and may be safely carried in any number in workmen's pockets or kits, ready for use should occasion require.

Without further elaboration, the foregoing will so fully explain the gist of this invention that others may, by applying current knowledge, readily adapt the same for use under varying conditions of service, without eliminating certain features which may properly be said to constitute the essential items of novelty involved, which items are intended to be defined and secured by the following claims.

I claim:

1. A cable terminal comprising a housing and a face plate therein, a bank of connecting studs on said face plate for the lines radiating therefrom, said housing including a bar having an inwardly extending flange at the top and the bottom of said face plate, an arrester carrying plate having one end engaging under the flange of one such bar and latching means at the other end to engage under the flange of the other bar, and one or more detachable arresters carried on said plate opposite said studs, each arrester having a spring-pressed line terminal making abutting pressure contact with the end of the stud of the line to be protected thereby when the arrester plate is so secured in operative position.

2. A cable terminal comprising a housing and a face plate therein, a bank of connecting studs on said face plate for the lines radiating therefrom, said housing including channel members at the top and bottom of said plate, an arrester plate over the studs having its upper end offset to fit under the flange of the upper channel, sliding latches on the inside of the other end of said arrester plate to engage under the flange of the lower channel, button arresters adapted to be dedetachably secured to said arrester plate opposite said studs, each arrester having a spring-pressed plunger line terminal abuttingly engaging the end of the stud of the line to be protected thereby when the arrester plate is secured in position, and a cover for the housing and arrester plate.

3. A terminal for a plurality of lines comprising a housing, a base therein, a bank of connecting studs on said base for outside lines, an arrester panel removably carried by the housing in front of the said bank of studs, said panel having provision for carrying removable arresters for the individual lines, one or more arresters on said panel, each arrester having a line terminal operatively engaging the stud of the line to be protected thereby, the removability of the panel giving ready access to the studs and arresters and the removability of the arresters enabling more or less of the lines to be protected, and a cover for the housing and panel separably removable from the latter two elements.

4. A terminal for a plurality of lines comprising a housing, an insulating plate therein, a bank of connecting studs on the plate for the lines to the outside, an arrester panel facing said studs and having provision thereon for arresters opposite said studs, one or more arresters on said panel, each of said arresters having a forwardly spring-pressed line terminal, means for pressing the panel bodily toward the studs and securing it to the housing in that position, the said terminals contacting the corresponding studs and being compressed thereby to form good contact therewith, in such attachment of the panel to the housing to provide arrester protection for the corresponding line or lines, and a cover for the housing and panel independently removable from both.

5. A terminal structure comprising a housing and a face plate therein having connecting studs for the radiating lines, an arrester unit therefor including a readily detachable panel secured to the housing over the studs, said panel having means for carrying individual arresters for the lines, one or more arresters on said panel, each arrester having a line terminal operatively engaging the stud of the line to be protected thereby, and an enclosing cover for the housing and panel independently removable from the latter two elements.

6. A terminal construction comprising a housing and a base plate therein, a bank of connecting studs on said base plate for the lines radiating therefrom, said housing including members at opposite edges, an arrester panel over the bank of studs and readily attachable to and detachable from said members, said arrester panel having means for carrying a bank of detachable arresters opposite the said studs, and one or more arresters in said means on said arrester panel, each arrester having a resiliently supported line terminal operatively engaging the stud of the line to be protected thereby when the panel is attached in position to the said members.

7. An arrester unit for a plurality of lines having a bank of connecting studs for the lines with a framework about the same and a removable cover fitting over said bank, comprising a supporting arrester panel adapted to be positioned in front of said bank and adjacently over the said studs and to be detachably secured to said framework independently of the cover, said panel having means for carrying individual detachable arresters for the said lines, and one or more arresters carried thereby, each arrester having a line terminal operatively engaging the stud of the line to be protected thereby when the panel is so positioned and secured to the framework.

8. An arrester unit for a line terminal structure, said structure having a supporting base with a bank of connecting studs thereon for a plurality of radiating lines, said unit comprising a panel adapted to be removably carried by said base in front of said stud bank, a plurality of detachable arresters on said panel arranged in bank form corresponding to said stud bank, and a spring line terminal for each arrester operatively contacting the stud of the corresponding line by the mounting of the panel on said base.

9. A terminal structure comprising a housing, a base plate therein, a bank of connecting studs on said base plate for radiating lines, an arrester panel detachably secured to the housing over the said studs, said panel having means adjacent the said studs for detachably carrying arresters for the lines, one or more arresters on said panel, each arrester having a line terminal operatively engaging the stud of the line to be protected thereby and another terminal for grounding the arrester, and a cover for the housing and panel independently removable from both.

10. A terminal structure comprising a housing, a base plate therein, a bank of connecting studs on said base plate for radiating lines, an arrester panel detachably secured to the housing over the said studs, said panel having means adjacent the said studs for detachably carrying arresters for the lines, one or more arresters on said panel, each arrester having a line terminal operatively engaging the stud of the line to be protected thereby and a ground terminal, means in connection with said panel for grounding said ground terminals of the arresters, and a cover for the housing and panel independently removable from both.

11. A terminal structure comprising a housing, a base plate therein, a bank of connecting studs on said base plate for radiating lines, a metal arrester panel detachably secured to the housing over the said studs, said panel having means adjacent the said studs for detachably carrying arresters for the lines, one or more arresters on said panel, each arrester having a line terminal operatively engaging the stud of the line to be protected thereby, the other terminal of the arrester being grounded by said carrying means when attached to the said panel, and a cover for the housing and panel independently removable from both.

JOHN S. BAKER.

REFERENCES CITED

The following references are of record in the file of this patent:

UNITED STATES PATENTS

| Number | Name | Date |
|---|---|---|
| 979,292 | Harner | Dec. 20, 1910 |
| 1,150,926 | Britton | Aug. 24, 1915 |
| 2,232,566 | Shroyer | Feb. 18, 1941 |